United States Patent [19]

Wood, III

[11] Patent Number: 4,560,289
[45] Date of Patent: Dec. 24, 1985

[54] SPINDLE MOUNTING ASSEMBLY WITH SQUEEZE FILM DAMPING

[75] Inventor: David B. Wood, III, West Chester, Ohio

[73] Assignee: Cincinnati Milacron Inc., Cincinnati, Ohio

[21] Appl. No.: 722,753

[22] Filed: Apr. 12, 1985

Related U.S. Application Data

[63] Continuation of Ser. No. 610,213, Jul. 11, 1984, abandoned, which is a continuation of Ser. No. 477,359, Mar. 21, 1983, abandoned.

[51] Int. Cl.$^4$ .............................................. F16C 27/00
[52] U.S. Cl. ...................................... 384/99; 384/535
[58] Field of Search ................. 384/99, 215, 535, 536, 384/581, 582, 611, 620

[56] References Cited

U.S. PATENT DOCUMENTS

| | | | |
|---|---|---|---|
| 3,359,613 | 12/1967 | Rye | 384/99 X |
| 3,456,992 | 7/1969 | Kulina | 384/100 |
| 3,836,215 | 9/1974 | Dopkin et al. | 384/99 |
| 3,897,985 | 8/1975 | Davis et al. | 384/495 |
| 3,947,079 | 3/1976 | Anderson | 384/603 |
| 3,980,358 | 9/1976 | Davis | 384/99 |
| 4,084,861 | 4/1978 | Greenberg et al. | 384/99 |
| 4,337,983 | 7/1982 | Hibner | 384/99 |

Primary Examiner—Stuart S. Levy
Assistant Examiner—David Werner
Attorney, Agent, or Firm—Thomas M. Farrell

[57] ABSTRACT

A rotatable spindle is carried in bearings located in one end of the bore in an adapter. The other end of the adapter is fixed in a machine base so as to cantilever the adapter. A damping chamber is formed along the adapter length between the machine base and the adapter, and a damping medium is provided in the damping chamber to control vibrations of the cantilever assembly. In one embodiment, a viscous damping medium is utilized to effectuate squeeze film damping. In an alternate embodiment, a visco-elastic damping medium is utilized in the damping chamber.

6 Claims, 1 Drawing Figure

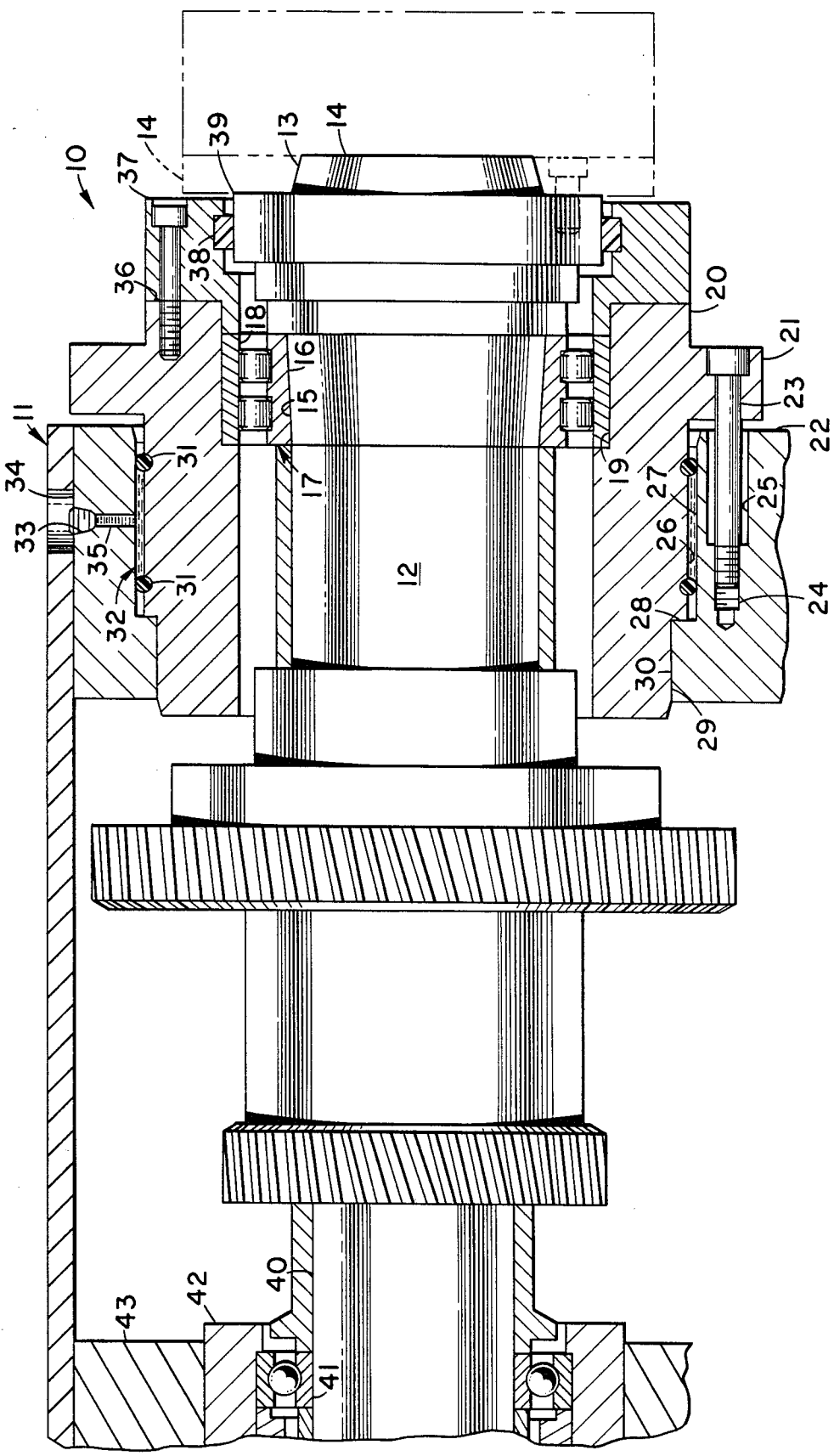

SPINDLE MOUNTING ASSEMBLY WITH SQUEEZE FILM DAMPING

Continuation of Ser. No. 610,213, July 11, 1984, abandoned, which is a continuation of Ser. No. 477,359, Mar. 21, 1983, abandoned.

BACKGROUND OF THE INVENTION

In workholding spindle assemblies typically used in turning and grinding machines, where the work is held in a chuck attached to the nose of a spindle, the most common prior art assemblies teach that the spindle mounting bearings should be placed as close to the end of the spindle as is possible, and that the outer race of an antifriction bearing assembly should be supported by a rigid machine structure, such as a spindle housing assembly backed up by ribs or walls to give a stiff structure with a minimum of deflection at the end of the spindle. The basic teaching of these assemblies is to produce a high static stiffness by the inherent mechanical springs involved, but no thought is given to damping the structure from induced vibrations, other than the material damping properties such as are found in nodular iron.

Present day assemblies are utilizing increasingly more units made from welded steel structures, lacking cast iron damping properties, and thus the change of vibrations causing problems at the work-tool interface are becoming more acute.

Applicant has obviated the difficulties inherent in the prior art assemblies, by utilizing, in a first embodiment, a squeeze film viscous damping structure at the mounting unit which carries the spindle bearing package.

In a second embodiment, a visco-elastic damping structure is utilized at the spindle mounting unit.

SUMMARY OF THE INVENTION

The invention is shown embodied in a damped spindle assembly, wherein a rotatable machine spindle has a spindle nose and bearing diameter near the spindle nose. A cylindrical spindle adapted is provided, having a bearing bore at its one end, containing a bearing supporting the spindle nose, and the opposite end of the cylindrical spindle adapter is provided with a diameter which is press fit into a machine base, so that in assembly, the spindle adapter provides a cantilever-type mounting of the spindle nose relative to the machine base. A bored damping cavity extends from the outer surface of the machine base to the press fit diameter, and a close fitting diameter is machined along the cylindrical adapter, between the bearing portion and the press fit portion, i.e., the cantilevered section. Seals are provided around the adapter in the cavity portion, so that a damping chamber is formed. The damping chamber is filled with a viscous medium such as heavy machine oil, so that a thin viscous film is provided in the damping chamber. In operation, the spindle assembly is free to move slightly because of the cantilever type mounting under the influence of machine vibrations, but the vibrations are damped by the phenomenon known as squeeze film damping, wherein the relatively sticky oil operating on opposing cavity surfaces will serve to attenuate the vibrations.

In an alternate embodiment, a visco-elastic damping medium is provided in the damping chamber.

BRIEF DESCRIPTION OF THE DRAWINGS

The single drawing FIGURE is an axial cross-section cut through a machine head stock, showing a damped spindle bearing assembly.

DESCRIPTION OF THE PREFERRED EMBODIMENT

A damped spindle bearing assembly 10 is depicted, wherein in a typical machine headstock 11, a spindle 12 has a spindle nose 13 at its outboard end for carrying a workholding chuck 14, and the spindle 12 is provided with a spindle bearing diameter 15 which is received in the inner race 16 of a double row antifriction bearing 17. The antifriction bearing 17 has an outer race 18 which is relatively stationary in the assembly 10 while the inner race 16 rotates with the spindle 12. The outer race 18 of the bearing 17 is carried in a bearing bore 19 of a spindle adapter 20 which is generally cylindrical, having an outer flange 21 for securing the adapter 20 into a machine base 22. Elongated cap screws 23 are provided through the adapter flange 21 and are received into threaded holes 24 lying at the bottom of a clearance hole 25 in the machine base 22, so that some relative lateral movement of the screws 23 can be accommodated by a moving spindle adapter 20 under the influence of machine vibration. A reduced diameter 26 on the spindle adapter 20 extends into a cooperating cavity 27 machined in the machine base 22, and at the end 28 of the cavity 27, a spindle adapter mounting diameter 29 is tightly fitted into a bore 30 in the machine base 22 so that the spindle adapter 20 creates a cantilever-type mounting arrangement of the spindle nose 13 with respect to the press fit diameter 29 on the spindle adapter 20. A pair of seals 31 are provided at spaced apart points in the damping cavity 27, so that a closed damping chamber 32 is therein formed. An access hole 33 is provided through the wall 34 of the machine base 22, so that a viscous medium 35 such as hydraulic oil may be introduced into the damping chamber 32, and the chamber 32 may be filled. The access hole 33 is plugged after filling. The outboard surface 36 of the spindle adapter 20 carries a seal mounting cap 37, which has a seal 38 surrounding the spindle seal diameter 39, so that any internal lubrication which is provided to the antifriction bearing 17 will not be lost to the atmosphere. The rear end 40 of the spindle 12 is conventionally supported in an antifriction bearing 41, which is supported and backed up directly by a bearing adapter 42 and the rear wall 43 of the machine base 22.

Thus, it can be seen that the rear end 40 of the spindle 12 is conventionally supported in a rigid structure having a high static stiffness, while the front of the spindle 12 is supported in a manner tending to produce a low static stiffness, that is, when deflection of the spindle nose 13 is statically measured. This type of mounting has not been seen in the prior art, since it tends to present a mounting arrangement which is seemingly the antithesis of good design practice. However, in actuality, when the damping chamber 32 is filled with a viscous medium 35 and the adapter 20 is allowed to relatively move with respect to the machine base 22, i.e., in a deflectable manner under the influence of machine vibrations and at high vibratory rates, the vibrations are attenuated by the phenomenon known as squeeze film damping, wherein the relatively shiftable members 20, 22 are constantly compressing and extending the tacky damping fluid 35. The overall net effect is that a high dynamic stiffness is achieved, that is, while the spindle 12 is rotating and cutting is being performed.

As an alternate embodiment, a visco-elastic damping material, such as PVC (polyvinyl chloride), may be substituted in the damping chamber 32 for the viscous medium 35. This type of material has the characteristic of being able to dissipate energy when displaced. The visco-elastic materials used in damping units behave quite definitely in an elastic manner up to some stress limit, but once that stress is exceeded, it flows until its area increases and stresses go down until it becomes elastic again.

Strictly considered, in a damper designed for squeeze film, the direct substitution of a visco-elastic material would result in somewhat less damping of the structure, but this may be suitable for some applications. The visco-elastic materials can have a damping capability 20 times that of rubber, but the squeeze film damper can possess a damping capability three or four times that of the visco-elastic damper.

It is not intended that the invention be limited to the specific embodiments shown herein, but rather the invention extends to all such designs and modifications as come within the scope of the appended claims.

What is claimed is:

1. A damped spindle assembly for a machine tool comprising:
a rotatable machine spindle having a spindle nose at one end and respective spindle bearings mounted proximal to said spindle nose and the opposite spindle end; a machine base having bearing mounting means for radially fixing said opposite spindle end bearing and having an outer base surface proximal said spindle nose end; an elongate damping cavity extending axially along said spindle into said base from said outer base surface to a cavity end, between said bearing mounting means and said outer surface; a spindle adapter mounting surface on said base proximal to said cavity end; an elongate spindle adapter having a spindle nose bearing mount proximal one end supporting said spindle nose bearing, and having an adapter mounting surface on said adapter proximal said opposite end; means for radially and axially securing said spindle adapter mounting surface to said base adapter mounting surface; an elongate damping surface on said spindle adapter extending axially along said spindle between said adapter mounting surface and said spindle nose bearing mount, said damping surface cooperatingly conformed to an spaced from said damping cavity thereby forming an elongate damping chamber axially along said spindle between said spindle nose bearing and said adapter mounting surface; and a damping medium maintained in said elongate damping chamber whereby said spindle adapter is affixed at one end to said base adapter mounting surface and its free end and therein-mounted spindle nose are relatively free to move radially with respect to said opposite spindle bearing while vibrations are damped in said damping chamber at a location between the spindle adapter fixed and free ends.

2. The assembly of claim 1, further including means for sealing said damping chamber and wherein said damping medium comprises a viscous damping medium.

3. The assembly of claim 1, wherein said damping medium comprises a visco-elastic damping medium.

4. A method for damping machine tool spindle vibrations, comprising the following steps:
(a) providing a machine spindle with a nose end spindle bearing and a rear end spindle bearing;
(b) mounting one end of an elongate spindle adapter to said spindle nose bearing and allowing said adapter to rearwardly extend axially along said spindle in the direction of the rear end spindle bearing;
(c) fixing the rearwardly-extending end of said adapter in a machine base at a first location;
(d) radially fixing and supporting the rear end spindle bearing in said machine base at a second location beyond said first location;
(e) providing an axially-extending damping cavity in said machine base between said spindle nose bearing and said fixed end of said spindle adapter;
(f) providing an axially-extending damping surface on said spindle adapter correspondingly shaped to, and radially spaced from, said damping cavity;
(g) providing a damping medium in said damping cavity; and
(h) allowing said spindle nose and associated spindle adapter end to move radially with respect to said radially-fixed rear end spindle bearing while said spindle is rotating.

5. The method of claim 4, wherein step (g) includes providing a viscous medium in said damping cavity, and said method further comprises the following step:
(i) sealing said damping cavity.

6. The method of claim 4, wherein step (g) includes providing a visco-elastic damping medium in said damping cavity.

* * * * *